United States Patent
Berkey et al.

(10) Patent No.: US 8,786,701 B2
(45) Date of Patent: Jul. 22, 2014

(54) METHOD AND APPARATUS FOR VIDEO SURVEILLANCE SYSTEM FIELD ALIGNMENT

(75) Inventors: Thomas F. Berkey, Tavernier, FL (US); Carlos DeJesus, Boynton Beach, FL (US); Lawrence R. Mills, Coral Springs, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1560 days.

(21) Appl. No.: 11/950,711

(22) Filed: Dec. 5, 2007

(65) Prior Publication Data

US 2008/0136910 A1   Jun. 12, 2008

Related U.S. Application Data

(60) Provisional application No. 60/873,379, filed on Dec. 7, 2006.

(51) Int. Cl.
   *H04N 7/18* (2006.01)

(52) U.S. Cl.
   USPC .......................................... 348/143; 348/151

(58) Field of Classification Search
   USPC ........................................................ 348/148
   See application file for complete search history.

(56) References Cited

U.S. PATENT DOCUMENTS

| | | | | |
|---|---|---|---|---|
| 4,120,004 A | * | 10/1978 | Coutta | 348/150 |
| 4,290,679 A | * | 9/1981 | Vockenhuber | 396/81 |
| 4,337,482 A | * | 6/1982 | Coutta | 348/159 |
| 5,570,236 A | * | 10/1996 | Hirasawa | 359/697 |
| 5,627,616 A | * | 5/1997 | Sergeant et al. | 396/427 |
| 5,850,254 A | | 12/1998 | Takano et al. | |
| 6,727,938 B1 | | 4/2004 | Randall | |
| 2003/0214592 A1 | * | 11/2003 | Ikeyama | 348/251 |
| 2005/0185058 A1 | * | 8/2005 | Sablak | 348/208.99 |
| 2006/0078162 A1 | * | 4/2006 | Wonneberger | 382/103 |
| 2008/0192123 A1 | * | 8/2008 | Lindsay | 348/208.2 |
| 2008/0225121 A1 | * | 9/2008 | Yoshida et al. | 348/159 |

FOREIGN PATENT DOCUMENTS

| | | |
|---|---|---|
| EP | 1475748 A2 | 11/2004 |
| GB | 2363023 A1 | 12/2001 |

(Continued)

OTHER PUBLICATIONS

Machine translation of JP 2004364030A.*

(Continued)

*Primary Examiner* — John MacIlwinen
*Assistant Examiner* — Angela Nguyen
(74) *Attorney, Agent, or Firm* — Christopher & Weisberg, P.A.

(57) ABSTRACT

The present invention provides a video surveillance apparatus and method of operation for a system having at least one predefined setting. A first parameter corresponding to an alignment of a video camera assembly with a visual target is stored. A second parameter corresponding to the alignment of a modified video camera assembly with the visual target is obtained. A difference between the first and second parameters is determined. The difference is applied to at least one of the predefined settings.

20 Claims, 5 Drawing Sheets

(56) References Cited

FOREIGN PATENT DOCUMENTS

| JP | 2000-513168 | A | | 10/2000 | | |
|----|-------------|---|---|---------|---|---|
| JP | 2001-103457 | A | | 4/2001 | | |
| JP | 2001-136431 | A | | 5/2001 | | |
| JP | 2004-364030 | A | | 12/2004 | | |
| JP | 2004364030 | A | * | 12/2004 | ............... | H04N 7/18 |
| JP | 2005-210507 | A | | 8/2005 | | |
| WO | 98/47117 | A1 | | 10/1998 | | |
| WO | 2007/059218 | A1 | | 5/2007 | | |
| WO | WO2007059218 | | * | 5/2007 | | |

OTHER PUBLICATIONS

International Search Report dated Jul. 25, 2008 from International Application No. PCT/US2007/025021, International Filing Date Dec. 6, 2007.

European_Patent_Office_Communication_94(3) dated Jun. 21, 2010 for European Regional Phase Application No. 07867655.8-1232 consisting of 9 pages.

Japanese Office Action and translation dated Feb. 5, 2013, issued in Japanese Patent Application Serial No. 2009-540301, (7 Pages).

* cited by examiner

METHOD AND APPARATUS FOR VIDEO SURVEILLANCE SYSTEM FIELD ALIGNMENT

CROSS-REFERENCE TO RELATED APPLICATION

This application is related to and claims priority to U.S. Provisional Patent Application Ser. No. 60/873,379, filed Dec. 7, 2006, entitled Video Dome and System, the entirety of which is incorporated herein by reference.

STATEMENT REGARDING FEDERALLY SPONSORED RESEARCH OR DEVELOPMENT n/a

FIELD OF THE INVENTION

The present invention relates to a method and apparatus for video surveillance system operation, and in particular to video field alignment.

BACKGROUND OF THE INVENTION

There are a number of known methods to eliminate or to work around video surveillance camera position errors. Typically, to reduce the likelihood of a positioning error, components of a video camera assembly or system are often manufactured in such a precise manner that any component tolerance or assembly errors do not significantly impact the accuracy of the dome. For instance, a camera block in the assembly can have some play, an image sensor mounted inside the camera block can be offset from the center of the lens, the gear-train can have inconsistencies, the homing sensors can have some mounting tolerances, the dome housing mounting mechanism can have fabrication tolerances, and finally the structure that the customer mounts the dome to can have some play. While such inaccuracies and assembly tolerances may have been acceptable in the past, several evolutionary factors in surveillance systems demand accuracy improvements. These advances require tighter tolerances as well as better performance repeatability from one similar component to the next.

In particular, video surveillance systems have progressed over the years from 1×-10× zoom lenses to present-day lenses having typical zoom capability of 1×-35× optical and up to 420× digitally. Given the dramatic increase in zooming capability, any error in positioning, whether originating in the manufacturing, assembly or installation of a particular component, is magnified to the point of making the system unusable. For example, at 35× zoom, a 1 degree error in the positioning of a surveillance camera will cause an offset of more than a half of the field of view. In this example, a 1 degree error would put whatever object or region that should have originally been at the center of the viewing field, just off the edge and out of view. Adding a 16× digital zoom capacity further compounds the problem.

Moreover, in previous systems, it was typically only necessary to have performance or positioning repeatability when establishing the home position. If a video surveillance camera were replaced, the operator would subsequently have to reload any previously identified targets, patterns, privacy zones, etc. However, increasingly advanced video surveillance products offer the capability to store the pan/tilt/zoom coordinates of the previously identified targets, patterns, privacy zones, etc. in a non-volatile memory in an I/O base or other device in the system which is external to the video dome or camera. As such, if a video camera needs to be replaced, the replacement camera can load all the setup data from the external memory device, thereby reducing operator overhead and installation/setup time to restore the previous functionality of the system. Still, in such a system, the replacement video cameras not only have to home with consistent, repeatable results, but they must also operate and perform substantially accurately and similarly from one camera to the next. As noted above, replacing a camera with one that operates with even 1 degree of difference due to equipment tolerances can result in the desired image being out of the field of view.

Factory calibration could potentially compensate for all but field-related installation accuracy problems. For example, a factory calibration could store offsets in pan and tilt to compensate for errors detected in home position. However, this would require dedicated personnel at the factory or repair center, and the associated cost, to calibrate every video camera assembly to a high degree of accuracy, even though the increased level of accuracy is needed only when one video camera is replacing another in a system having many targets, patterns, privacy zones and other specialized settings with a high zoom level.

In view of the above, it is desirable to provide an on-site, low cost field alignment system and method that allows a replacement video camera to compensate for camera-to-camera alignment variations, including tolerance or shifting of the mounting base, platform or other field related alignment issues.

SUMMARY OF THE INVENTION

In accordance with one embodiment, the present invention advantageously provides a video surveillance apparatus having at least one predefined setting in which a processor compares a first parameter corresponding to a position of a video camera assembly to a second parameter corresponding to the position of a modified video camera assembly. The processor determines a difference between the first and second parameters and applies the difference to at least one of the predefined settings. The first parameter may include at least one of a pan position, tilt position and/or zoom value of the video camera assembly. The second parameter may also include at least one of a pan position, tilt position and/or zoom value of the modified video camera assembly. The system may also include an electronic storage device accessible by the processor, where the electronic storage device stores the first and second parameters. The plurality of predefined settings for the system may include a privacy zone setting and/or a surveillance pattern setting.

The present invention also provides a method of configuring a video surveillance system having a plurality of predefined settings. A first parameter corresponding to an alignment of a video camera assembly with a visual target is stored. A second parameter corresponding to the alignment of a modified video camera assembly with the visual target is obtained. A difference between the first and second parameters is determined. The difference is applied to at least one of the plurality of predefined settings. The modification of the configuration may include relocating at least a portion of the video camera assembly, or alternatively, substituting at least one component of the video camera assembly with at least one replacement component. The first and second parameters may include at least one of a pan position, tilt position and/or zoom value of the video camera assembly.

Another aspect of the present invention provides a method of configuring a video surveillance system. At least one video camera assembly position setting is defined. A first parameter corresponding to at least one of the video camera assembly position settings is stored. A second parameter corresponding to at least one of the plurality of video camera assembly position settings is obtained. A difference between the first and second parameters is determined. The difference is applied to the remaining video camera assembly position settings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
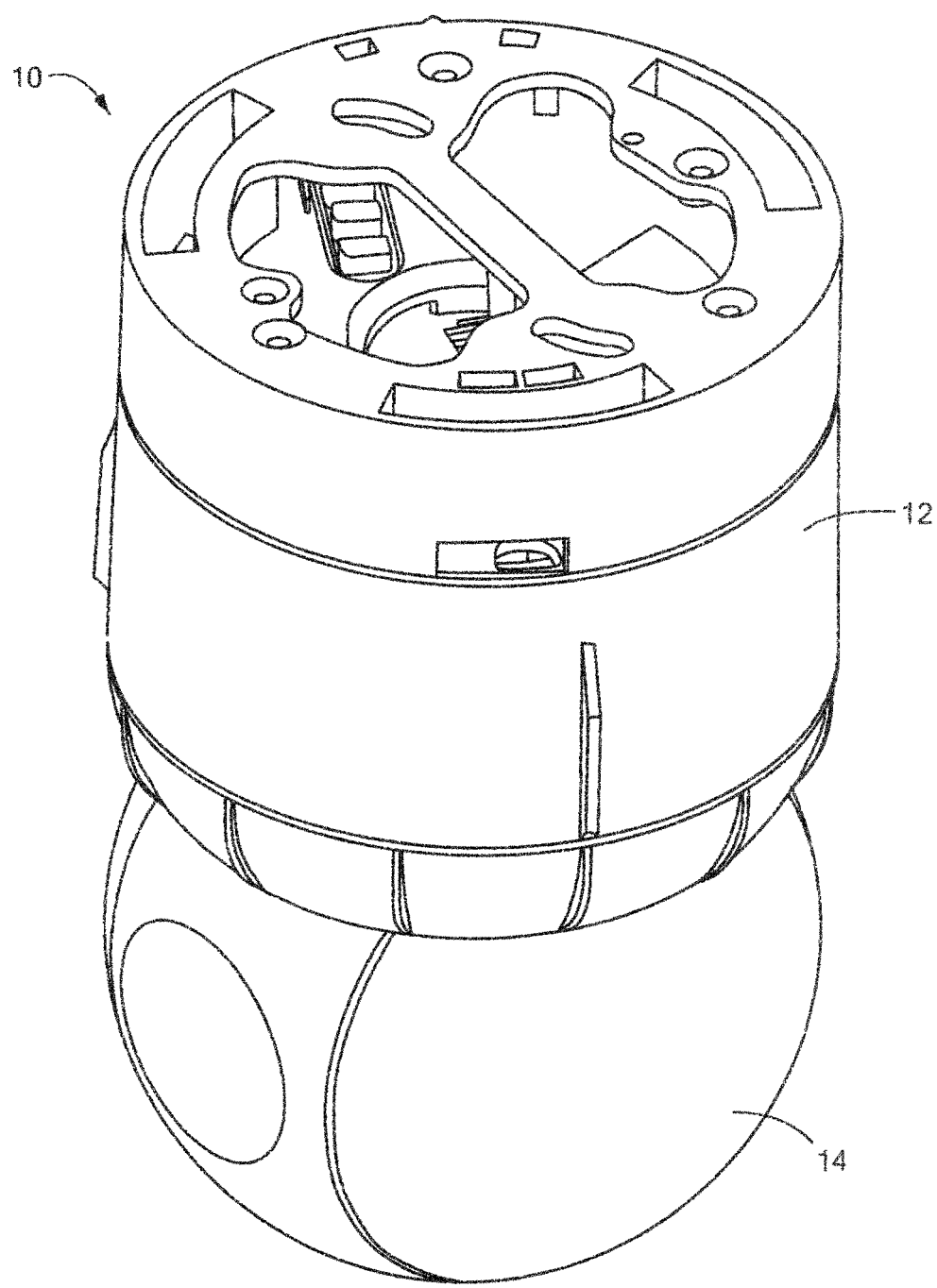
FIG. 1 is a perspective view of a video surveillance system constructed in accordance with the principles of the present invention.

The present invention provides a video surveillance system and a method for operation or verification of the functionality thereof. Referring now to the drawing figures in which like reference designators refer to like elements, there is shown in FIG. 1, a video surveillance system constructed in accordance with the principles of the present invention and designated generally as "10". The video surveillance system 10 may generally include a housing assembly 12 in operative communication with a camera assembly 14, each of which may contain various mechanical and electrical components facilitating the operation thereof.

Figure 2:
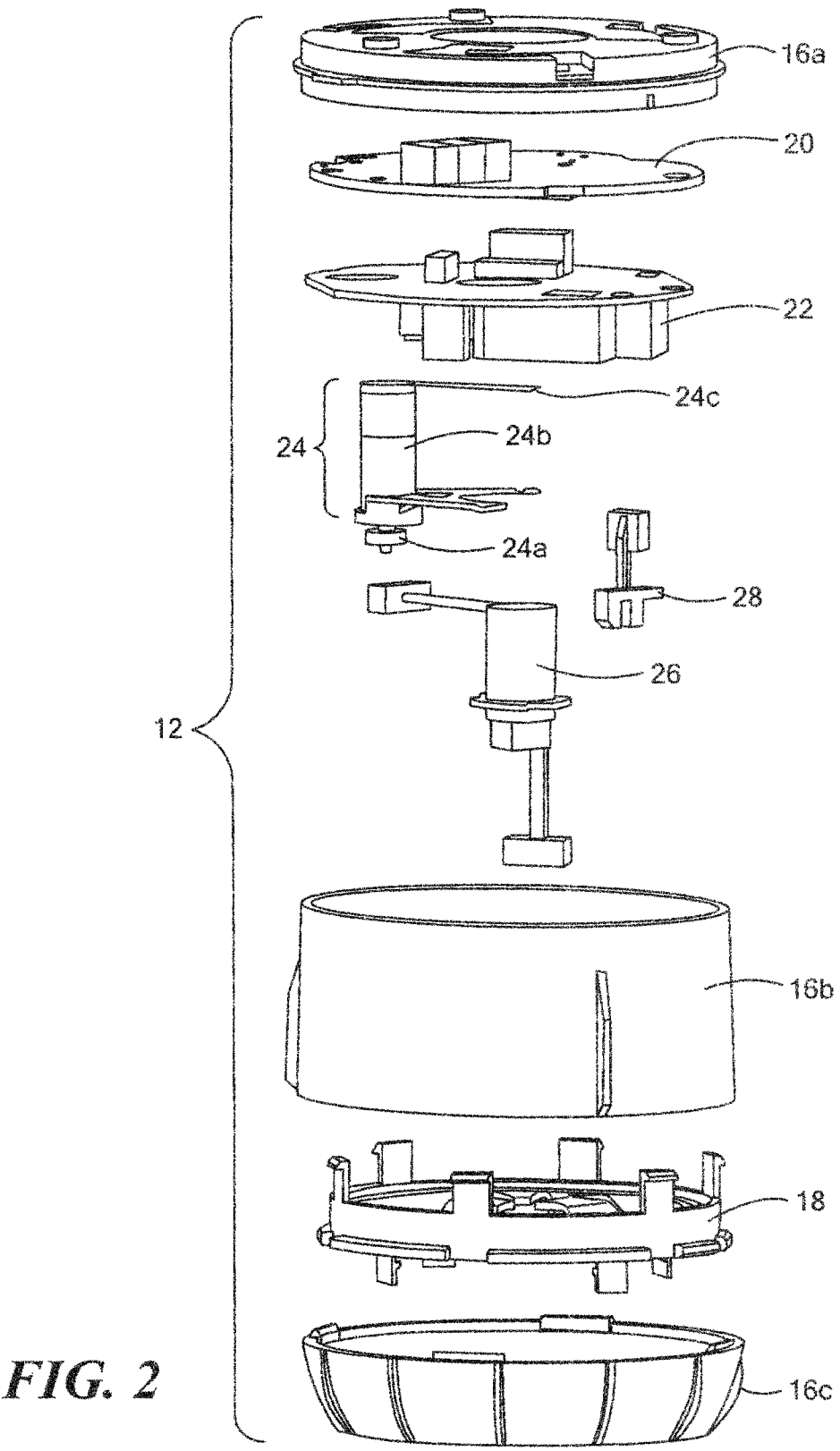
FIG. 2 is an exploded view of a housing assembly of the video surveillance system of FIG. 1.

Now referring to FIG. 2, in particular, the housing assembly 12 may include one or more housing elements 16a, 16b, 16c (referred to collectively herein as housing elements 16) encasing or otherwise enclosing a portion of the housing assembly contents. The housing elements 16 may be movably engaged to one another by a rotatable bearing pan platform 18 or similar mechanical coupling. The housing assembly 12 may further include a printed circuit or CPU board 20 and a power supply 22 coupled to a pan motor 24. The CPU board 20 may include one or more processors, memory components, controllers, and/or a communications interface (not shown) for receiving, storing and/or executing commands or input from a remote location and for driving the pan motor 24. The power supply 22 may include a power source, such a battery or the like, and/or may further include electrical components for receiving and appropriately converting AC power from an external source to power the components described herein. The pan motor 24 may include a DC motor having the desired form factor and/or dimensions positionable within the housing assembly while having sufficient torque output to controllably move the desired components of the video surveillance system.

The housing assembly 12 of the video surveillance system 10 may further include a motor assembly 24 having a gear train 24a coupled to a pan motor 24b and an encoder 24c, where the motor assembly 24 imparts, transfers, or otherwise conveys the output of the motor 24b to additional portions of the video surveillance system 10 to produce the desired movement. In particular, the encoder 24c may include a mechanical or optical incremental rotary encoder used to indicate movement of either the gear train 24a or the pan motor 24b. The movement indication can be used to determine the relative pan position of the camera assembly 24 as well as to actuate the pan motor 24 to move a portion of the housing assembly 12 and/or the camera assembly 14 along a desired motion pattern or series of controlled movements. In addition, a slip-ring assembly 26 may also be included in the housing assembly 12 and may further be coupled to the rotatable bearing platform 18 and housing element 16c to both provide an electrical connection to the pan platform, as well as enable the platform to move in an unlimited number of contiguous 360° revolutions. The housing assembly may also include an optical sensor 28 for monitoring portions of the housing assembly 12 during operation.

Figure 3:
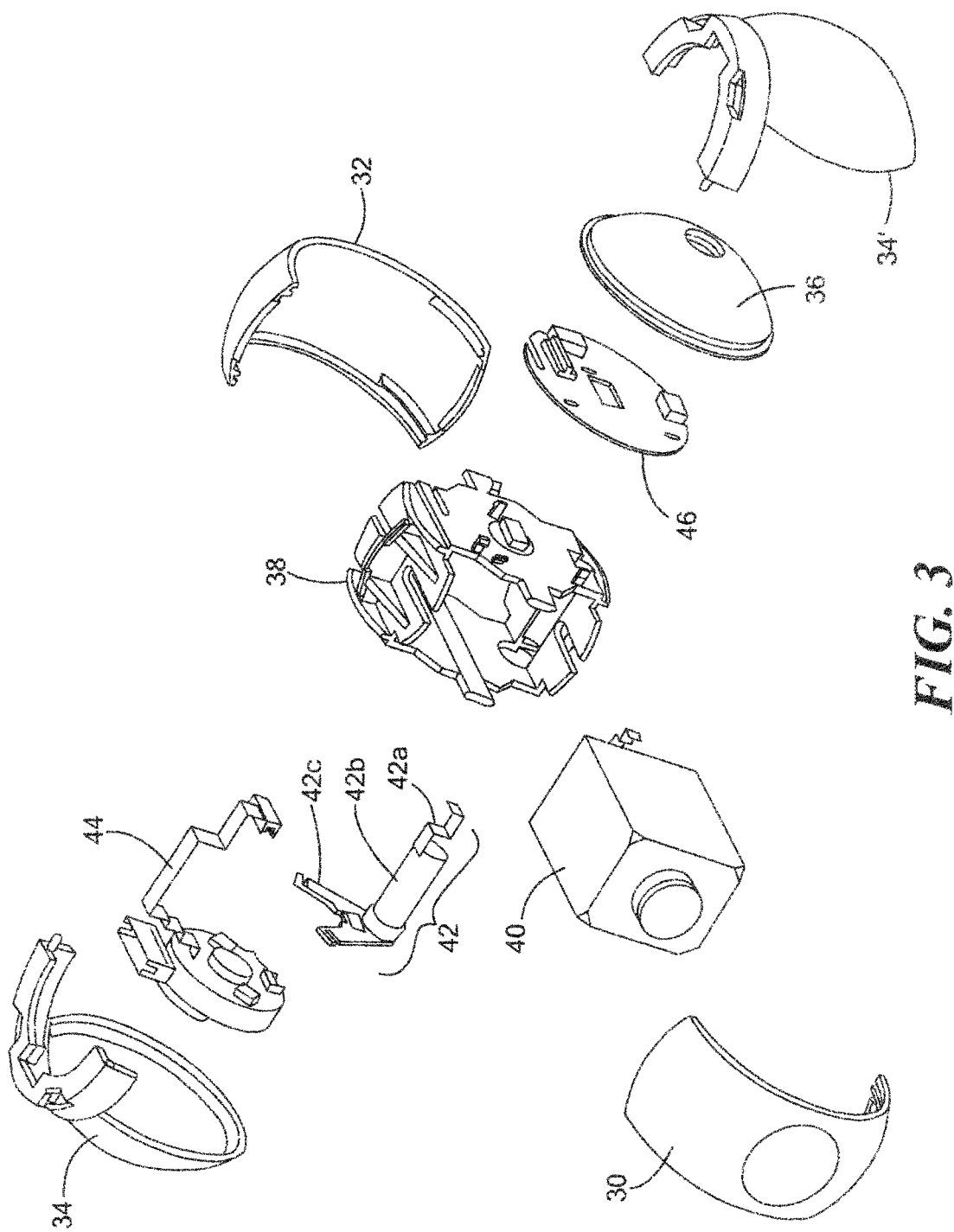
FIG. 3 is an exploded view of a camera assembly of the video surveillance system of FIG. 1.

As shown in FIG. 3, the camera assembly 14 of the video surveillance system 10 of the present invention may generally include one or more camera housing elements able to form a shell or cavity to contain or otherwise enclose additional components of the assembly. For example, there may be a front 30, rear 32, and two side 34, 34' camera housing elements engageable with one another, where one or more of the housing elements are rotatably or otherwise movably coupled to the others by a bearing component 36 and a tilt gear/bearing assembly 44. The camera assembly 14 may also include a camera cradle or yoke 38 able to receive a camera 40 securely therein. The camera 40 may include any device able to capture a visual image, including but not limited to color cameras, black and white cameras, digital capture devices, etc.

A tilt motor assembly 42 having a tilt encoder 42a, a tilt motor 42b, and a tilt gear train 42c may be disposed within the camera assembly 14. In addition, a PC board 46 may also be included in the camera assembly 14 within the housing. The tilt motor 42b may be mechanically coupled to the camera cradle 38 for movement thereof, while the tilt encoder 42a may be similar to the pan encoder 24c described above with respect to the pan motor assembly 24, i.e., the encoder may include a mechanical or optical incremental rotary encoder for monitoring the rotation or movement of the tilt motor 42b. The PC board 46 may include one or more electrical components, processors, memory components, controllers, cable connectors and/or drivers (not shown) for receiving, storing, and/or conveying commands to and driving the tilt motor assembly 42, as well as for receiving, storing, and/or transmitting images generated by the camera 40.

Figure 4:
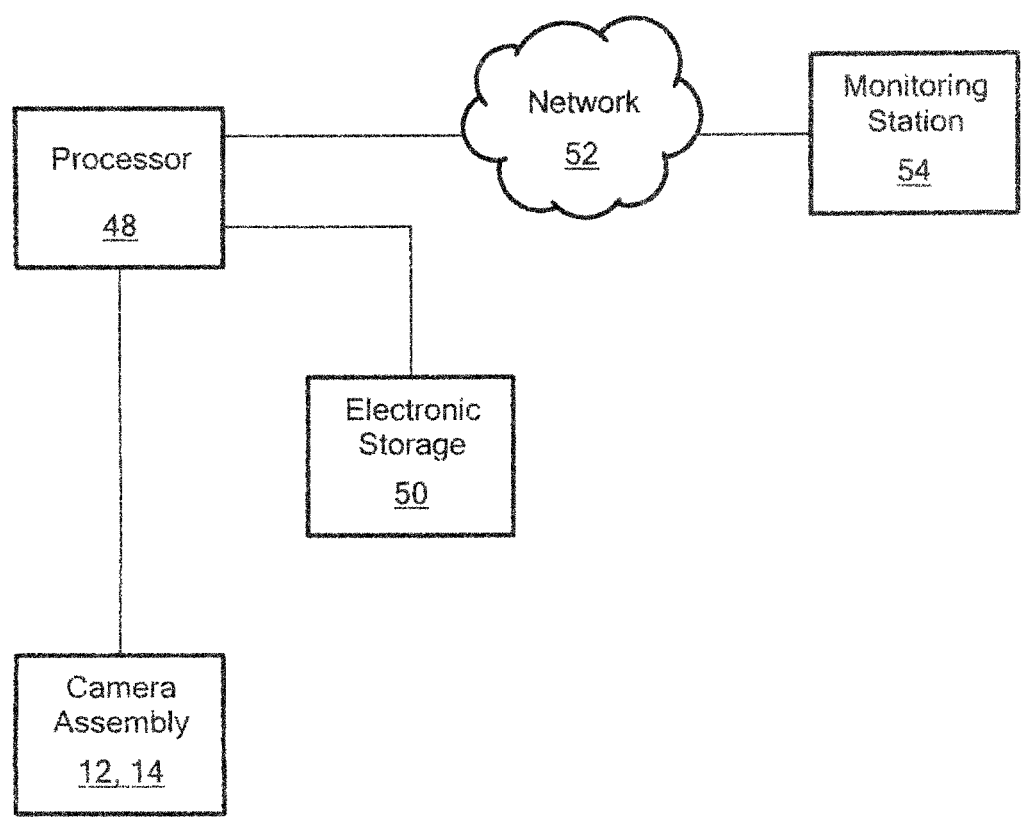
FIG. 4 is a block diagram of a video surveillance system constructed in accordance with the principles of the present invention.

The video surveillance system of the present invention may be operable to record and/or store one or more parameters related to particular camera positions correlating to the resulting visual reference frames. Now referring to FIG. 4, a block diagram of an improved system and method for operating the video surveillance system illustrated in FIGS. 1-3 is shown. In particular, the system includes a processor 48 operably and/or electrically coupled to a video camera assembly, such as either and/or both of the housing assembly 12 and camera assembly 14 and the components therein described above. The processor 48 may include a micro-controller, microprocessor or other device able to send and receive signals and/or commands during operation of the video surveillance system, and to further control or otherwise actuate the one or more motors of the system in response to the sent and/or received signals. The processor 48 may further include and/or interact with an electronic storage component 50 which stores commands, settings, signals, executable instructions, scripts or the like employed during operation. The electronic storage component 50 may include volatile or non-volatile memory such as, for example, static random access memory (SRAM), dynamic random access memory (DRAM), fast page mode dynamic random access memory (FPM DRAM), extended data-out dynamic random access memory (EDO DRAM), synchronous dynamic random access memory (SDRAM), double data rate synchronous dynamic RAM (DDR SDRAM), electronically erasable programmable read only memory (EEPROM) such as flash memory with or without a controller, hard disk enabled virtual memory, and/or other data storage devices that may be operably coupled to the processor 48.

In addition, the processor 48 may be coupled to a wired or wireless communication network 52 for sending and receiving signals or commands from a monitoring station 54, which may be at a remote secondary location from the camera assembly. Of note, the processor 48, electronic storage component 50, and other electronic components described herein may be integrated or otherwise embodied within either and/or both of the printed circuit/CPU boards 20, 46 described above. In addition, although not shown, the monitoring station 54 may include one or more processors and/or electronic components capable of performing the processes and methods described herein. Further, the hardware components described herein, including the processor 48 and/or storage component 50, may also be contained within a ceiling mount or similar structure engageable with a portion of the housing assembly and/or camera assembly at an installation site. As such, the processor 48 and/or the storage component 50 may remain operable at a particular video camera assembly site, even if portions of the video assembly are subsequently replaced.

In an exemplary method of operating the video surveillance system of the present invention, one or more pre-selected or predefined operational settings and their corresponding parameters, e.g., pan/tilt/zoom settings, may be setup or otherwise stored in the electronic storage component 50 for a particular surveillance system. For example, the operational settings may include one or more preset visual targets or locations within the viewing range of a particular video camera assembly (i.e., "front door," "driveway," etc.), as well as a zoom setting or other adjustable system characteristic that may be manipulated to provide the desired visual reference frame captured by the camera. The operational settings may further include, for example, text overlays (labels) on particular views, defined privacy zones, surveillance camera sweep patterns, or any other specified preset setting or performance criteria used for the implementation of a particular surveillance system. Subsequently, if a configuration of one or more components of the video surveillance system is changed, adjusted, or otherwise modified, a parameter correlating to the previous configuration may be compared to a similar parameter of the changed configuration, and a difference between the two may be globally or systemically applied to all of the pre-selected operational settings to thereby correct any alignment discrepancy presented in the system.

Figure 5:
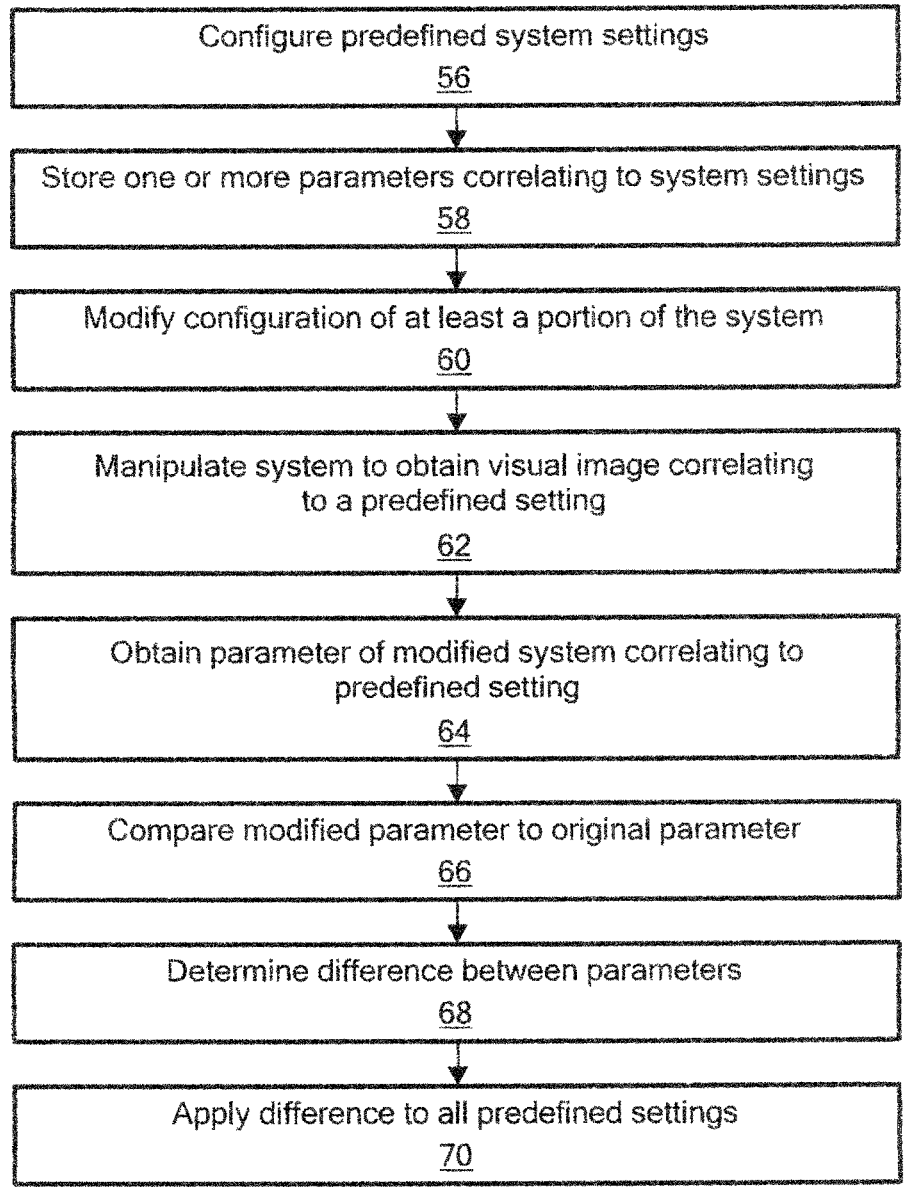
FIG. 5 is a flow chart of an embodiment of video surveillance system field alignment operation in accordance with the principles of the present invention.

For example, referring now to the flow chart of FIG. 5, an exemplary method of aligning a video surveillance system subsequent to a component modification and applying any alignment discrepancy correction to the pre-selected settings of the system is shown. Initially, a video surveillance system, which may include one or more video camera assemblies, is installed in desired positions to monitor or otherwise capture selected visual images of targets or regions of interest. The system may be configured with one or more predefined settings, e.g., pan/tilt/zoom settings, corresponding to a location, performance setting, or adjustable characteristic of the operation of a portion of the video camera assembly to obtain the desired visual feedback (Step 56). For example, the camera assembly may include several preset positions (i.e., preset #1—Front Door; preset #2—Cash Register; preset #3—Rear Exit, etc.) for rapidly obtaining or monitoring a particular visual target or region upon the triggering of an alarm, selection of the preset, etc. The particular position of the video camera correlating to a preset area may be obtained and/or otherwise relayed to the processor by the encoder/sensors coupled to the motors as described above, for example (e.g., pan position at 20 degrees; tilt position at 32 degrees). The settings may further include areas or privacy zones which should not be monitored and/or which the camera is restricted from visually capturing based on one or a range of pan/tilt/zoom settings, sweeping visual patterns, etc. Moreover, the settings may also include correlating zoom characteristics, e.g., Front Door—4× zoom; Cash Register, 8× zoom, etc. One or more parameters, such as motor/camera position, lens movement, or the like, relating to the configured settings may be stored and recalled during operation of the system (Step 58). In addition, one or more graphical markers or overlays may be saved in conjunction with the preset image area to outline or otherwise mark a feature or object within the viewing filed, i.e., a corner of a door, window, a building, or the like. The graphical markers may be saved with offset coordinates corresponding to their positions on the monitoring device. The particular feature or point of interest may be graphically mapped with respect to the viewing area and subsequently recalled with respect to additional or modified views, as described further below.

Upon configuring or otherwise defining the desired characteristics or presets of the video surveillance system and storing parameters correlating to the selected presets, one or more components of the video surveillance system may subsequently be adjusted, changed, or otherwise modified (Step 60). For example, circumstances may dictate the movement or repositioning of a portion of a video camera assembly (i.e., additional visual coverage needed to the left, a viewing obstruction has developed for part of the viewing field, etc.). Alternatively, one or more components of the video surveillance system (motors, sensors, camera itself, etc.) may need to be replaced due to malfunction, degraded performance, upgraded technology, or the like. The modified system configuration may adversely affect the alignment of one or more video camera assemblies. In other words, the modified system may not be exactly aligned with the previous, unaltered system, and as such, discrepancies arise with respect to the visual regions correlating to the previously defined settings. As discussed above, even small differences in alignment can remove significant portions of the desired viewing field when operating at significantly high zoom levels.

As such, once the system has been modified or experiences a change in configuration, the modified camera assembly may be positioned or adjusted to obtain the visual reference or target correlating to one of the preset, defined settings (such as "Front Door," for example) (Step 62). The adjustment to obtain the previous visual reference or target may be aided in several ways by the inclusion of an alignment indicator as part of the saved parameters, such as by the inclusion of an alignment indicator as part of the saved parameters. For example, a saved visual display of the unmodified camera configuration may be visible during the repositioning of the modified configuration, such as on an additional monitoring display or via a printed image or the like. Moreover, the graphical markers and/or overlays can be saved in connection with one or more items or landmarks in the viewing field of the original presets and may be projected onto the present visual display as a guide for obtaining the original viewing field. For instance, the corners of a door in a saved viewing field may have been graphically annotated for the original preset, and thus the modified configuration could be manipulated so that the graphical markers projected onto the present viewing field are again aligned with the door. As such, the image or viewing field could be recaptured with the modified configuration with a substantially reduced likelihood of error or visual offset.

Once the desired image field or visual target is captured with the modified system, one or more parameters correlating to the particular, modified camera configuration may be obtained (such as motor position, lens position, etc.) (Step 64). The parameter obtained from the modified system may be substantially identical to the parameter previously obtained for the unaltered system, i.e., the parameter may be the pan position, for example. The modified parameter may then be compared to the previously stored parameter correlating to the original, unaltered camera assembly configuration and the defined setting (Step 66). E.g., "preset #1: pan position of 19 degrees and a tilt position of 37 degrees," while the modified camera assembly configuration for the same preset includes "pan position of 22 degrees and a tilt position of 36 degrees." Any discrepancy or offset between the parameters correlating to the particular preset may be determined (Step 68), and the difference or offset discrepancy may be stored in the electronic storage device 50 and/or at the monitoring station, and may subsequently be applied to all of the other predefined settings based on the single comparison (Step 70).

For the given example, for instance, a pan position of −3 degrees and a tilt position of +1 degree may be added to all other presets ("Cash register," "Rear Exit," etc.) by the processor 48, which can recalculate and/or restore modified settings or simply calculate a discrepancy or offset in real time during operation. Alternatively, the determination and/or calculation of an offset value may be performed by one or more components at the monitoring station 54, where the offset value may then be applied to provide a command or signal having offset-adjusted absolute coordinates directly to the video camera assembly. In this case, the processor 48 and/or its functionality is provided as part of the monitoring station 54. As such, a comparison and determination of a difference between parameters for a single predefined setting of the video surveillance system may be applied systemically to all other predefined settings or visual targets, thereby eliminating the need to redefine each and every setting, target, privacy zone, etc. every time the system is reconfigured or modified.

The above-described method may be performed at the monitoring station 54 using a visual display or the like illustrating instructions for proceeding. For example, an operator may select a particular predefined view for calibration of the modified system. The operator may then be instructed to pan and tilt the video camera assembly until the presented view is aligned with the previously defined, saved view. Upon entering an acknowledgement that the desired view has been obtained, the processor and/or portion of the system may save any pan and tilt offset differences between the previous, unaltered configuration and the modified system, and may subsequently factor in the difference whenever going to other predefined views, patterns, privacy-zones, etc.

The above-described alignment procedure compensates for sources of alignment error, thereby allowing lower cost and less precise mounting hardware to be used. The described methods may be performed in a controlled factory setting, as well as in the field by potential customers. The ability to perform the described methods in the field allows the customer to compensate for field related variations in video camera alignment. While the majority of video surveillance systems may only need to have a high degree of performance and/or alignment repeatability from one power-up to the next, this novel approach described above eliminates the need for the factory to perform absolute position calibration across an entire product line, which of course subsequently lowers the cost of manufacturing.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A video surveillance apparatus comprising:
    a memory, the memory configured to store at least one predefined setting;
    a processor in communication with the memory, the processor configured to:
        compare a first parameter corresponding to a position of a video camera assembly configuration to a second parameter corresponding to the position of a modified configuration of the video camera assembly;
        determine a difference between the first and second parameters; and
        replace the stored at least one predefined setting with at least one modified predefined setting, the at least one modified predefined setting being based at least in part on the determined difference.

2. The apparatus of claim 1, wherein the first parameter includes at least one of a pan position, a tilt position, and a zoom position.

3. The apparatus of claim 1, wherein the first parameter includes an alignment indicator.

4. The apparatus of claim 1, wherein the stored at least one predefined setting is a stored plurality of predefined settings; and
    the processor is further configured to replace at least substantially all of the stored plurality of predefined settings with a plurality of modified predefined settings, the plurality of modified predefined settings being based at least in part on the determined difference.

5. The apparatus of claim 1, wherein the memory is further configured store the first and second parameters.

6. The apparatus of claim 1, wherein the at least one predefined setting is a target position.

7. The apparatus of claim 1, wherein the at least one predefined setting is a privacy zone setting.

8. The apparatus of claim 1, further comprising at least one of a sensor and encoder in communication with the processor, the processor is further configured to obtain the second parameter from the at least one of the sensor and encoder.

9. The apparatus of claim 2, wherein the second parameter includes at least one of a pan position, a tilt position, and a zoom position.

10. A method of configuring a video surveillance system comprising:
    storing, in a memory, a plurality of predefined settings;
    storing a first parameter corresponding to an alignment of a video camera assembly configuration with a visual target;

obtaining a second parameter corresponding to the alignment of a modified configuration of the video camera assembly with the visual target;

determining, using a processor, a difference between the first and second parameters; and replacing at least one of the stored plurality of predefined settings with at least one modified predefined setting, the at least one modified predefined setting being based at least in part on the determined difference.

11. The method of claim 10, wherein the configuration is modified based at least in part on a relocation of at least a portion of the video camera assembly.

12. The method of claim 10, wherein the configuration is modified based at least in part on a substitution of at least one component of the video camera assembly with at least one replacement component.

13. The method of claim 10, wherein the first parameter includes at least one of a pan position, a tilt position, and a zoom position.

14. The method of claim 10, wherein the first parameter includes at least one alignment indicator.

15. The method of claim 10, further comprising replacing substantially all of the stored plurality of predefined settings with a plurality of modified predefined settings, the plurality of modified predefined settings being based at least in part on the determined difference.

16. The method of claim 10, wherein the plurality of predefined settings includes a target position.

17. The method of claim 10, wherein the plurality of predefined settings includes a privacy zone setting.

18. The method of claim 10, wherein the plurality of predefined settings includes a surveillance pattern setting.

19. The method of claim 13, wherein the second parameter includes at least one of a pan position, a tilt position, and a zoom position.

20. A method of configuring a video surveillance system, comprising:

storing, in a memory, a plurality of video camera assembly position settings;

storing a first parameter corresponding to at least one of the plurality of video camera assembly position settings;

obtaining a second parameter corresponding to at least one of the plurality of video camera assembly position settings;

determining, using a processor, a difference between the first and second parameters; and replacing the remaining stored video camera assembly position settings with at least one modified video camera assembly position setting, the at least one modified video camera assembly position setting being based at least in part on the determined difference.

* * * * *